US011975429B1

(12) United States Patent
Usina, III et al.

(10) Patent No.: US 11,975,429 B1
(45) Date of Patent: May 7, 2024

(54) TOOL FOR REMOVING AND INSTALLING A TANKLESS WATER HEATER INLET FILTER

(71) Applicant: USINA INVESTMENTS, LLC, St. Augustine, FL (US)

(72) Inventors: Charles R. Usina, III, St. Augustine, FL (US); Richard Wood, Frisco, TX (US)

(73) Assignee: USINA INVESTMENTS, LLC, St. Augustine, FL (US)

( * ) Notice: Subject to any disclaimer, the term of this patent is extended or adjusted under 35 U.S.C. 154(b) by 0 days.

(21) Appl. No.: 18/216,804

(22) Filed: Jun. 30, 2023

Related U.S. Application Data

(60) Provisional application No. 63/445,503, filed on Feb. 14, 2023.

(51) Int. Cl.
*B25B 27/14* (2006.01)

(52) U.S. Cl.
CPC .................................... *B25B 27/14* (2013.01)

(58) Field of Classification Search
CPC ...................................................... B25B 27/14
See application file for complete search history.

(56) References Cited

U.S. PATENT DOCUMENTS

| | | | |
|---|---|---|---|
| 4,836,065 A | 6/1989 | Setliff | |
| 4,846,025 A | 7/1989 | Keller et al. | |
| 5,193,239 A | 3/1993 | Dolce et al. | |
| 5,456,278 A | 10/1995 | Morris et al. | |
| 5,699,701 A | 12/1997 | Cotten, Jr. | |
| 6,119,563 A | 9/2000 | Fleck | |
| 6,347,563 B1 | 2/2002 | Witt | |
| 6,871,401 B1 | 3/2005 | Blackenship | |
| 8,001,801 B2 | 8/2011 | Coleman | |
| 2008/0223181 A1 | 9/2008 | Cline | |
| 2023/0013633 A1* | 1/2023 | Ogrodnick | .............. B25B 27/14 |

* cited by examiner

*Primary Examiner* — Rick K Chang
(74) *Attorney, Agent, or Firm* — ALLEN, DYER, DOPPELT + GILCHRIST, P.A.

(57) ABSTRACT

A tool for removing a tankless water heater inlet filter includes a base portion having a hexagonal shape and size configured to be engaged by a socket. The tool also includes a head portion coupled to and aligned with the base portion and configured and sized to fit inside a filter cap of the tankless water heater inlet filter, wherein the inlet filter is for installation in a tankless water heater inlet line and has an engagement device along an inner periphery. In addition, the tool includes at least one reciprocal engagement device of the head portion configured to engage with the engagement device of the filter cap and as a result of rotating the base portion causes the inlet filter to rotate.

17 Claims, 7 Drawing Sheets

TOOL FOR REMOVING AND INSTALLING A TANKLESS WATER HEATER INLET FILTER

CROSS-REFERENCE TO RELATED APPLICATIONS

This application claims the benefit of U.S. provisional application No. 63/445,503 filed Feb. 14, 2023, which is hereby incorporated herein in its entirety by reference.

FIELD

The present invention relates to the field of tankless water heaters, and, more particularly, to a tool for removing and installing a tankless water heater inlet filter.

BACKGROUND

Tankless water heaters are becoming more popular to replace large tanks that are currently used to heat water. In contrast to existing water tank heaters, a tankless water heater instantaneously heats water as it passes through the continuous flow system. Tankless water heater assemblies are more efficient because they only heat water on demand and do not store heated water. However, a problem sometimes associated with tankless water heaters is their need for maintenance and repair. One way to reduce costly repairs is to clean or change the water inlet filter on a regular basis. However, the water inlet filter can be difficult to remove.

Accordingly, there is a need in the art for a tool that can assist in removing and replacing the water inlet filter for a tankless water heater.

SUMMARY

In view of the foregoing background, it is therefore an object of the present invention to provide a tool that makes it easy to remove a tankless water heater inlet filter. The tool includes a base portion having a shape and size configured to be engaged by a socket, and a head portion extending from the base portion and configured and sized to fit inside a filter cap of the tankless water heater inlet filter. The tankless water heater inlet filter is for use in a tankless water heater inlet line and has an engagement device along an inner periphery of the filter cap. The head portion of the tool includes at least one reciprocal engagement device that is configured to engage with the engagement device of the tankless water heater inlet filter. Thus, rotating the base portion of the tool causes the tankless water heater inlet filter to rotate and be removed or installed.

The base portion of the tool may have a polygonal shape, such as a hexagon, and the head portion may have a circular shape. The circular head portion may comprise a lower circular member and an upper circular member, where the upper circular member has a diameter less than the lower circular member creating a ledge therebetween. In addition, the reciprocal engagement device of the head portion may have a first slot and a second slot perpendicular to the first slot. In another aspect, the reciprocal engagement device of the head portion has only one slot. In yet another aspect, the reciprocal engagement device of the head portion may have a pair of opposing tabs extending alongside the head portion and extending from the base portion. The base portion and the head portion comprise plastic or metal such as aluminum, for example.

In another particular aspect, a filter kit for a tankless water heater is disclosed. The filter kit includes a replacement tankless water heater inlet filter, and a tool for removing a tankless water heater inlet filter and installing the replacement tankless water heater inlet filter. The tankless water heater inlet filter has a filter cap, and an engagement device is disposed along an inner periphery of the filter cap. The tool includes a base portion having a shape and size configured to be engaged by a socket, a head portion extending from the base portion and configured and sized to fit inside the filter cap of the tankless water heater inlet filter, and at least one reciprocal engagement device of the head portion that is configured to engage with the engagement device of the tankless water heater inlet filter. Rotating the base portion causes the tankless water heater inlet filter to rotate and be removed, and installing the replacement tankless water heater inlet filter is done by rotating the base portion in the opposite direction.

In yet another particular aspect, a method to remove and install a tankless water heater inlet filter is disclosed. The method includes using a tool comprising a base portion having a shape and size configured to be engaged by a socket, a head portion extending from the base portion and configured and sized to fit inside a filter cap of the tankless water heater inlet filter, and at least one reciprocal engagement device of the head portion configured to engage with an engagement device of the tankless water heater inlet filter. The method includes inserting the head portion of the tool into the filter cap to engage the engagement device of the tankless water heater inlet filter, placing a socket (or wrench or pliers, for example) over the base portion of the tool, and rotating the socket to cause the tankless water heater inlet filter to rotate in a first direction to remove the tankless water heater inlet filter from a tankless water heater inlet line.

The method also includes inserting a replacement tankless water heater inlet filter into the tankless water heater inlet line, and rotating the socket to cause the replacement tankless water heater inlet filter to rotate in an opposing second direction to install the replacement tankless water heater inlet filter into the tankless water heater inlet line.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
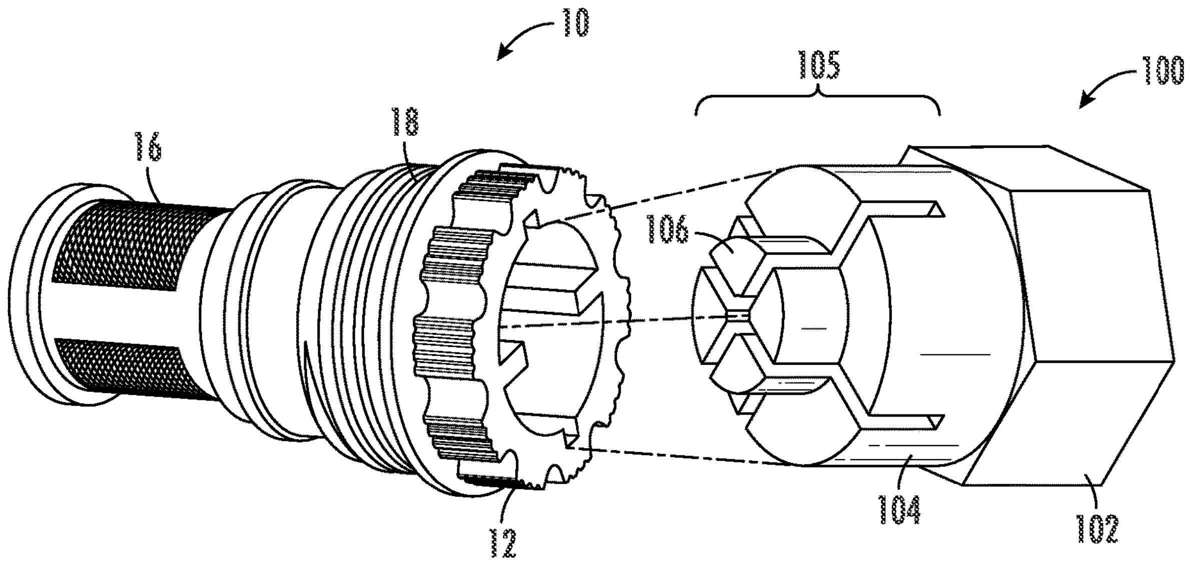
FIG. 1 is an exemplary tankless water heater inlet filter that can be installed or removed by a tool in accordance with the present disclosure.
Figure 2:
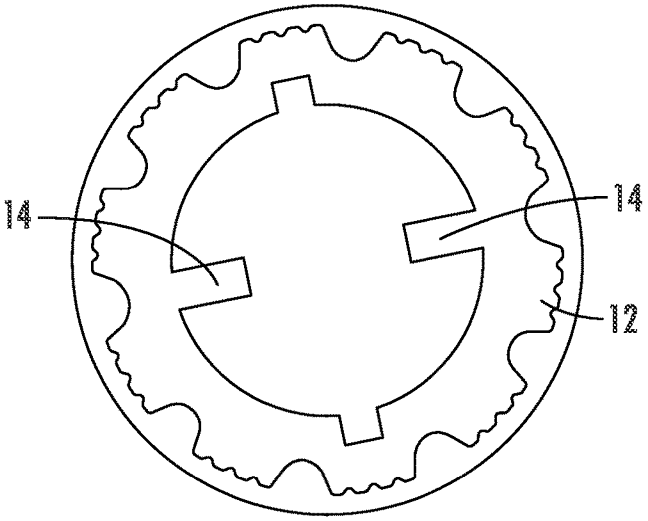
FIG. 2 is a top view of the tankless water heater inlet filter.
Figure 3:
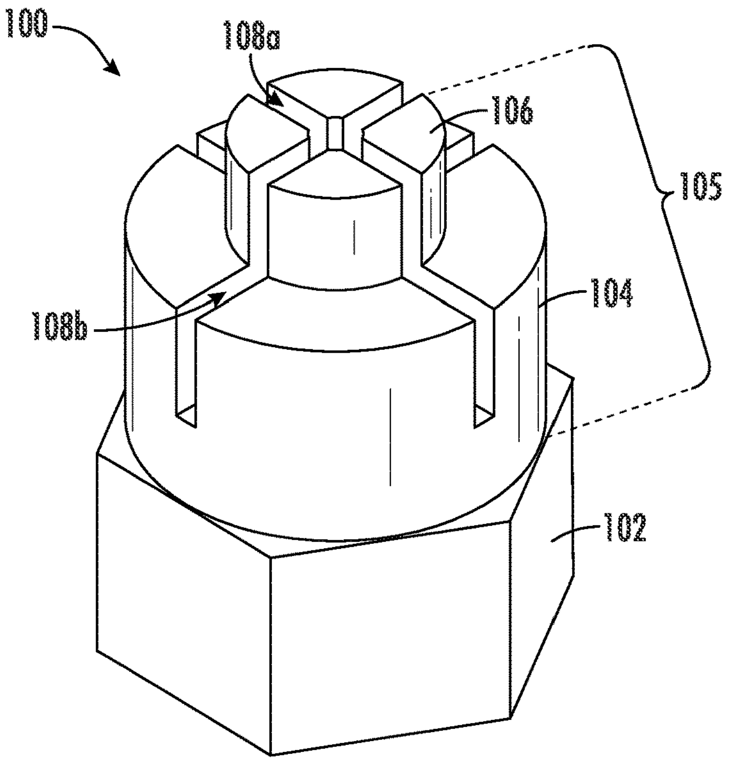
FIG. 3 is a perspective view of the tool.
Figure 4:
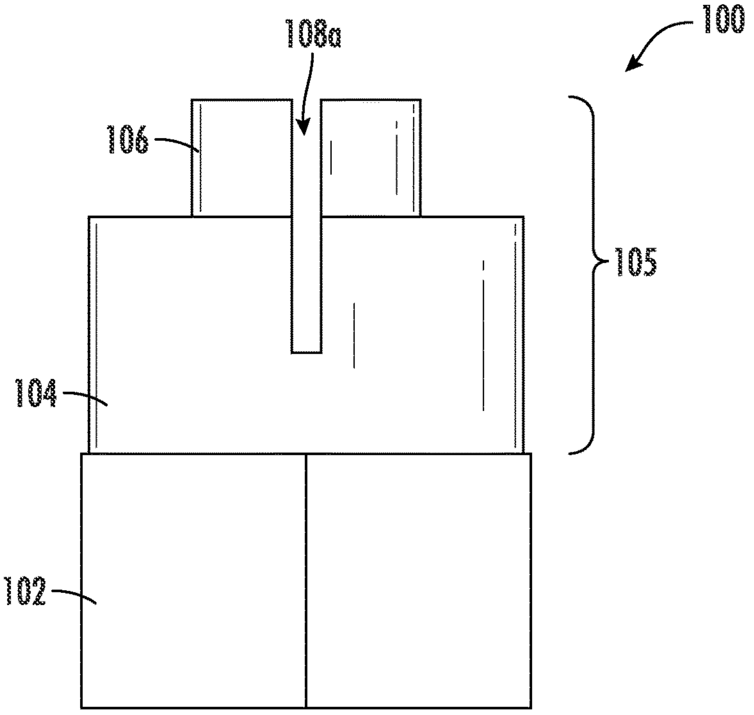
FIG. 4 is a front elevational of the tool.
Figure 5:
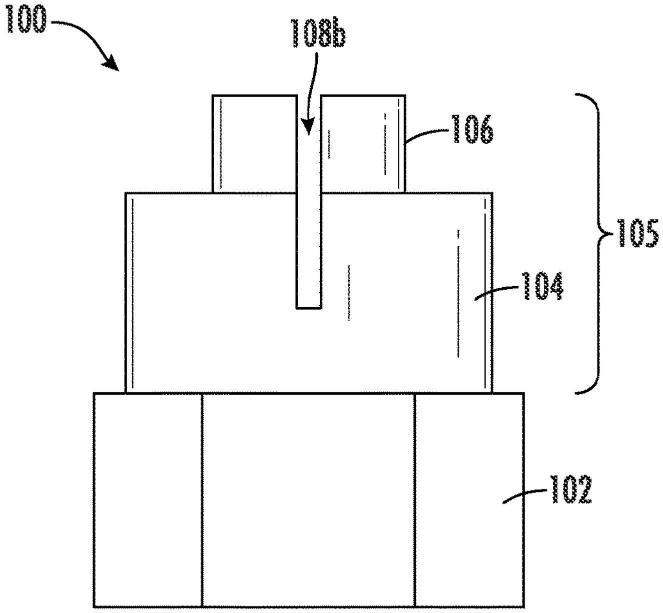
FIG. 5 is a side elevational view of the tool.
Figure 6:
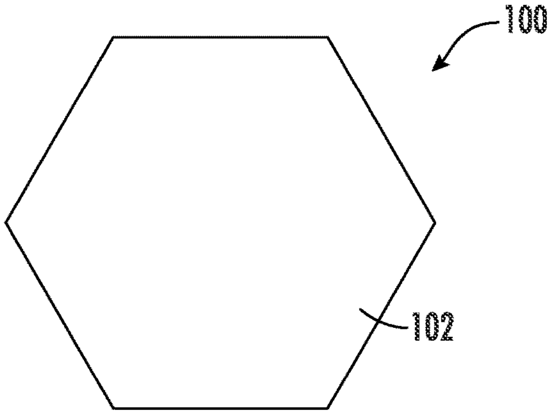
FIG. 6 is a bottom view of the tool.

Referring now to FIGS. 1 and 2, an exemplary inlet filter 10 for a tankless water heater is shown. The inlet filter 10 includes a filter cap 12 and screen 16. The filter cap 12 includes external spiral threading 18 that is used to secure the inlet filter 10 within a tankless water heater inlet line. The filter cap 12 also has a pair of engagement devices 14 such as protrusions or walls, for example, along its inner periphery as best shown in FIG. 2.

A tool 100 for removing the inlet filter 10 in accordance with the present disclosure is shown in FIG. 1. The tool 100 includes a base portion 102 having a polygonal shape and size configured to be engaged by a socket or wrench. Typically, the base portion 102 has a hexagonal shape but could be square or other shape having straight sides that can be gripped by a socket or wrench, for example. In another aspect, the base portion 102 may not have a polygonal shape and includes a hand grip twist knob so that the tool 100 can be used without a separate socket or wrench.

Referring now to FIGS. 3-7, The tool 100 also includes a head portion 105 extending from the base portion 102 and that is configured and sized to fit inside the filter cap 12 of the tankless water heater inlet filter 10. The head portion 105 in a particular aspect has a circular shape and comprises a lower circular member 104 and an upper circular member 106. The upper circular member 106 has a diameter less than the lower circular member 104 thereby creating a ledge therebetween. In addition, the head portion 105 of the tool 100 includes at least one reciprocal engagement device 108*a*, 108*b* that is configured to engage with the engagement device 14 of the filter cap 12. In response to rotating the base portion 102 of the tool 100, the inlet filter 10 is rotated and can be removed from the inlet line.

The upper circular member 106 having a smaller diameter helps to slide and guide the tool 100 into the correct position making it easier for the user to engage the protrusions or walls 14 of the inlet filter 10 with the tool 100.

Figure 7:
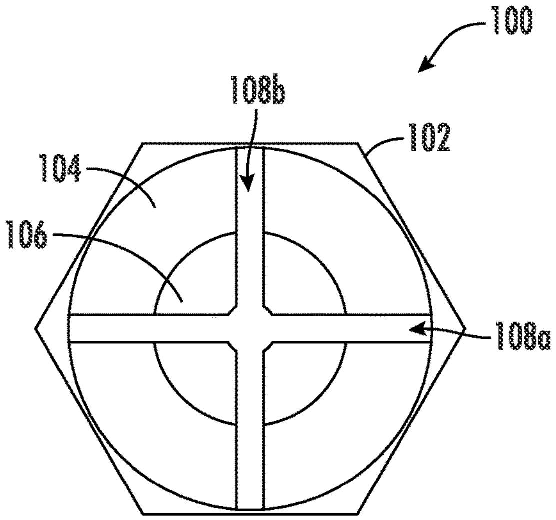
FIG. 7 is a top view of the tool.
Figure 8:
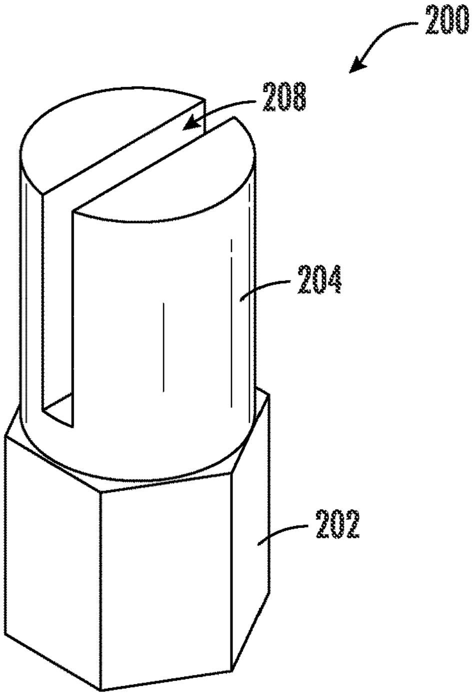
FIG. 8 is a perspective view of another aspect of the tool for removing a tankless water heater inlet filter in accordance with the present disclosure.
Figure 9:
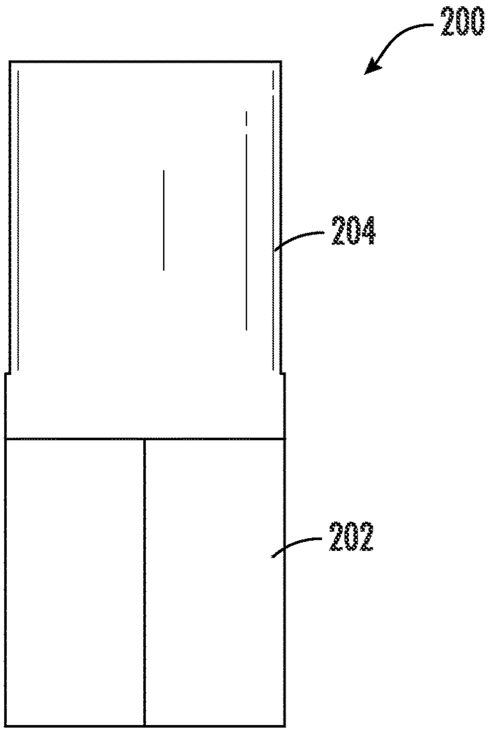
FIG. 9 is a front elevational of the tool shown in FIG. 8.
Figure 10:
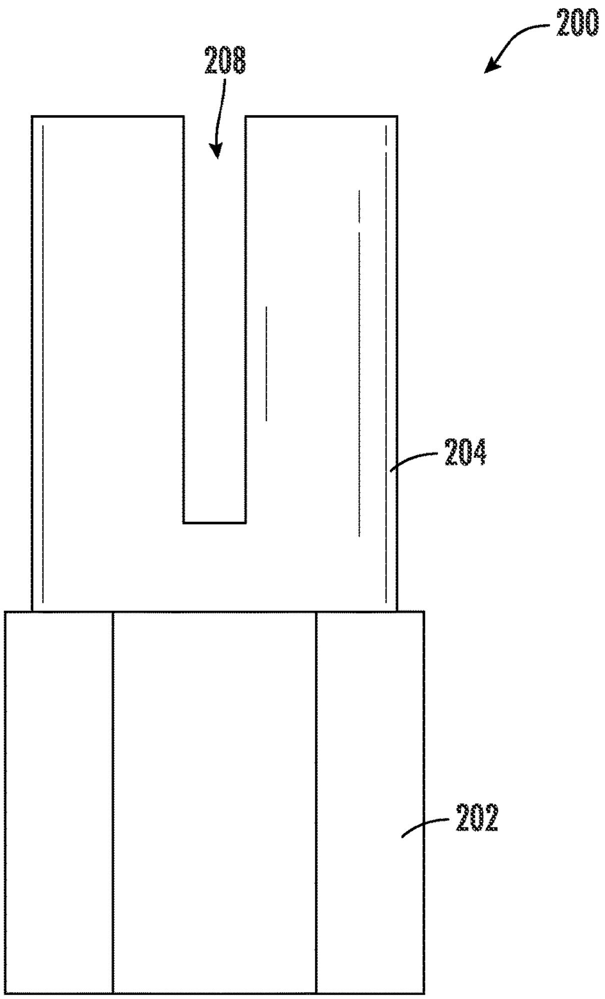
FIG. 10 is a side elevational view of the tool shown in FIG. 8.
Figure 11:
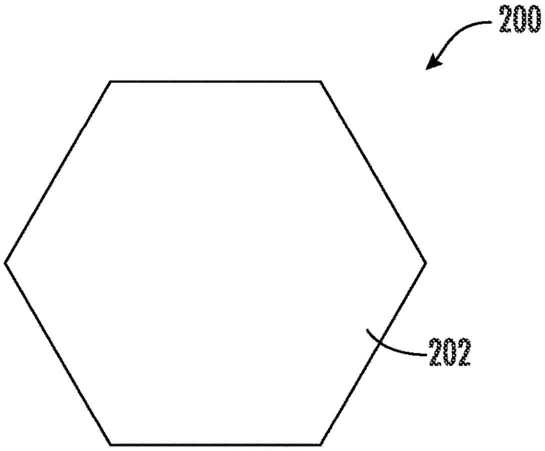
FIG. 11 is a bottom view of the tool shown in FIG. 8.
Figure 12:
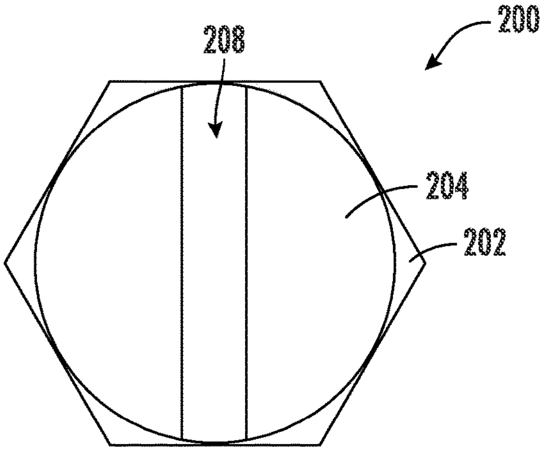
FIG. 12 is a top view of the tool shown in FIG. 8.
Figure 13:
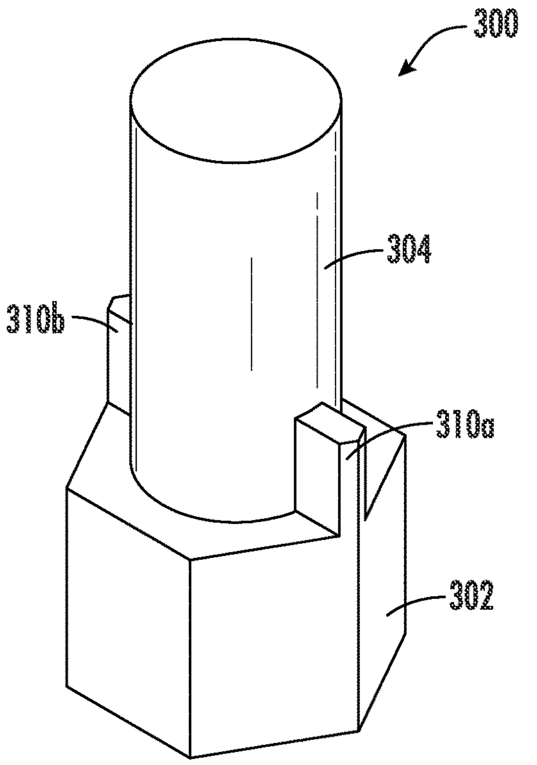
FIG. 13 is a perspective view of yet another aspect of the tool for removing a tankless water heater inlet filter in accordance with the present disclosure.
Figure 14:
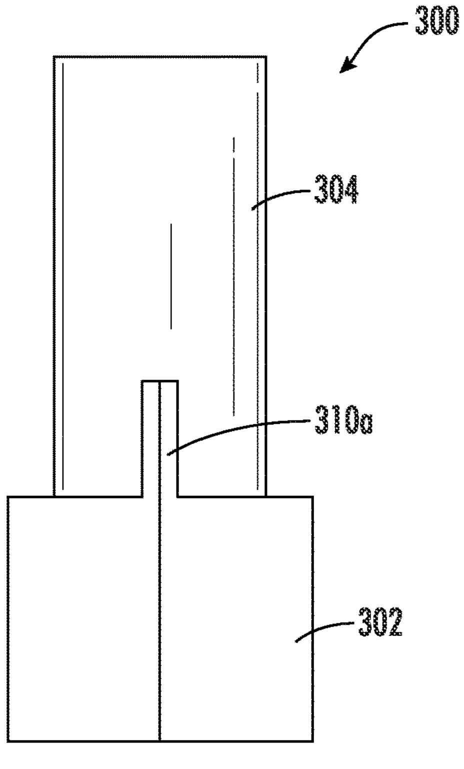
FIG. 14 is a front elevational of the tool shown in FIG. 13.
Figure 15:
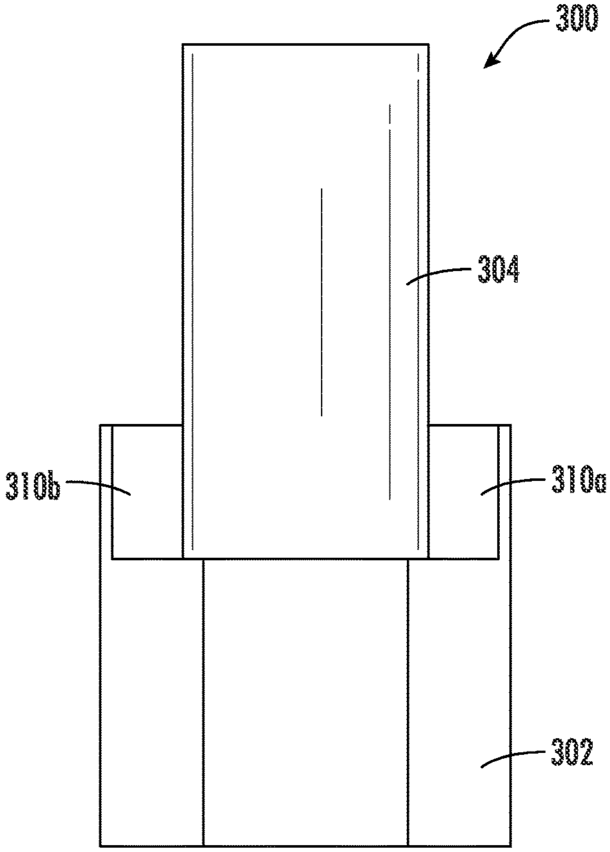
FIG. 15 is a side elevational view of the tool shown in FIG. 13.
Figure 16:
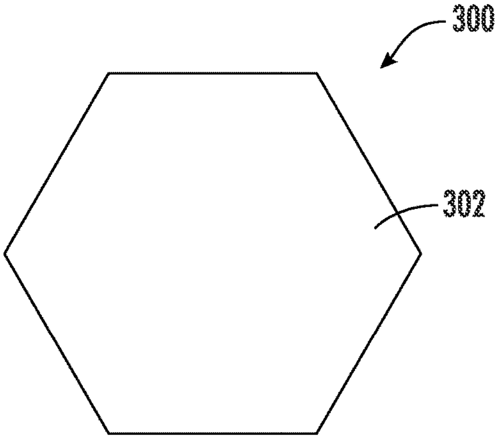
FIG. 16 is a bottom view of the tool shown in FIG. 13.
Figure 17:
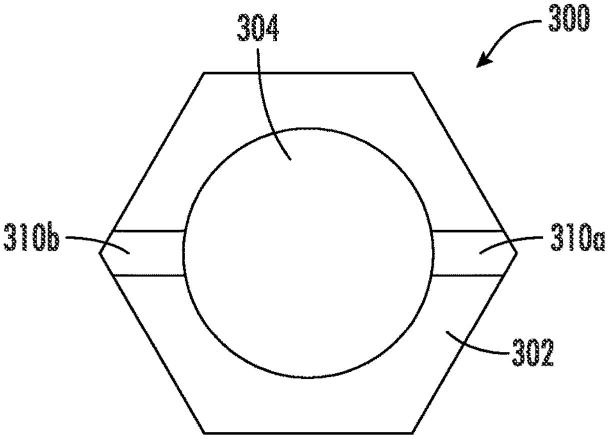
FIG. 17 is a top view of the tool shown in FIG. 13.

In a particular aspect, the engagement device of the tool 100 comprises perpendicular slots 108A, 108B as shown in FIG. 7. Accordingly, the reciprocal engagement device 108*a*, 108*b* (e.g., slots) of the tool 100 are configured to slidingly engage the protrusions or walls 14 of the filter cap 12 so that when the tool 100 is rotated, the inlet filter 10 is also rotated making removal and installation easier.

It is important that the slots 108*a*, 108*b* of the tool 100 engage along substantially the entire length of the protrusions or walls 14 so that they are not broken or damaged when torque is applied. The external spiral threading 18 of the filter cap 12 is tightly engaged with matching spiral threading within the tankless water heater inlet line when installed to prevent water leaks. Thus, a substantial amount of force is required to loosen the inlet filter 10 for removal.

The tool 100 makes it easier to remove the inlet filter 10 when the area around the inlet line to the tankless water heater is partially blocked by other utilities and pliers or other tools are not usable because of the limited space. In some cases, a socket extension can be used with the tool 100 in order to achieve a mechanical advantage to remove the inlet filter 10 from a distance. Also, as those of ordinary skill in the art can appreciate, the base portion 102 may be a different shape other than hexagonal that can be used with a socket, wrench or other similar tool. The base 102 may also have a star shaped drive, for example, to be used with an appropriate bit or fitting.

Due to different brands of tankless water heaters, not all inlet filter caps are the same. Accordingly, referring to FIGS. 8-12, another aspect of a tool 200 for removing a tankless water heater inlet filter is shown.

In this particular aspect, the tool 200 includes a base portion 202 having a hexagonal shape and size configured to be engaged by a socket. The tool 200 also includes a head portion 204 coupled to and aligned with the base portion 202 and configured and sized to fit inside the filter cap 12 of the tankless water heater inlet filter 10 as described above. However, instead of two perpendicular slots, the reciprocal engagement device comprises only one slot 208 to engage the protrusions or walls 114 of the filter cap 12.

The base portion 202 of the tool 220 may have a hexagonal shape but could be square or other shape, or have a star drive, for example. The base 202 may include a hand grip twist knob so that the tool 200 can be used without a separate socket or wrench.

The tool 300 shown in FIGS. 13-17 is yet another aspect of a tool 300 to remove a tankless water heater inlet filter 12. The tool 300 includes a base portion 302 having a hexagonal shape and size configured to be engaged by a socket as explained above.

The tool 300 also includes a head portion 304 coupled to and aligned with the base portion 302 and configured and sized to fit inside the filter cap 12 of the tankless water heater inlet filter 10. However, instead of slots as discussed above, the tool 300 comprises a pair of opposing tabs 310*a*, 310*b* extending outward. Accordingly, the pair of opposing tabs 310*a*, 310*b* of the tool 300 are configured to engage the walls 14 of the filter cap 12 along one side of each rather than along both sides of the opposing walls 14.

A method to remove and install a tankless water heater inlet filter 10 using a tool 100, 200, 300 as described above includes inserting a head portion of the tool into the filter cap 12 to engage the engagement device of the tankless water heater inlet filter, placing a socket over the base portion of the tool, and rotating the socket to cause the tankless water heater inlet filter to rotate in a first direction to remove the tankless water heater inlet filter from a tankless water heater inlet line.

The method includes inserting a replacement tankless water heater inlet filter into the tankless water heater inlet line, and rotating the socket over the base portion of the tool to cause the replacement tankless water heater inlet filter to rotate in an opposing second direction to install the replacement tankless water heater inlet filter into the tankless water heater inlet line. As discussed above, in a particular aspect the reciprocal engagement device of the head portion of the tool 100 used with this method includes a first slot 108*a* and a second slot 108*b* perpendicular to the first slot 108*a*. In another aspect of the claimed method, the reciprocal engagement device of the head portion of the tool 200 comprises only one slot 208. In yet another aspect, the method includes a tool 300 having a reciprocal engagement device that comprises a pair of opposing tabs 310*a*, 310*b* extending alongside the head portion and extending from the base portion.

The various aspects of the tool described above provide an easier way for removing and installing a tankless water heater inlet filter during maintenance. The method of using the tool overcomes the shortcomings of using channel locks or needle nose pliers. The tool allows for the safe removal and installation of the inlet filter without damaging the filter cap or the tankless water heater itself.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A tool for removing and installing a tankless water heater inlet filter comprising:

a base portion having a bottom end and an opposing top end, the base portion having a plurality of base sidewalls around its periphery extending from its bottom end to the top end of the base, wherein the periphery of the base portion having a polygonal shape formed by the plurality of base sidewalls;

a head portion having a bottom end adjacent to the top end of the base portion, the head portion being aligned with and concentric with the base portion and the head portion having a head sidewall around its periphery extending from its bottom end to a free end of the head portion, wherein the head portion is configured and sized to fit inside a filter cap of the tankless water heater inlet filter and the periphery of the head portion having a circular shape formed by the head sidewall, and wherein the tankless water heater inlet filter is for use in a tankless water heater inlet line and has an engagement device along an inner periphery of the filter cap; and at least one reciprocal engagement device of the head portion configured to engage with the engagement device of the tankless water heater inlet filter and as a result of rotating the base portion causing the tankless water heater inlet filter to rotate and be removed.

2. The tool of claim 1, wherein the circular head portion comprises a lower circular member and an upper circular member, the upper circular member having a diameter less than the lower circular member creating a ledge therebetween.

3. The tool of claim 2, wherein the reciprocal engagement device of the head portion comprises a first slot and a second slot perpendicular to the first slot.

4. The tool of claim 1, wherein the reciprocal engagement device of the head portion comprises only one slot.

5. The tool of claim 1, wherein the reciprocal engagement device of the head portion comprises a pair of opposing tabs extending alongside the head portion and extending from the base portion.

6. The tool of claim 1, wherein the base portion and the head portion comprise plastic.

7. The tool of claim 1, wherein the base portion and the head portion comprise metal.

8. A filter kit for a tankless water heater, the filter kit comprising:

a replacement tankless water heater inlet filter having a filter cap and an engagement device along an inner periphery of the filter cap; and a tool for removing a tankless water heater inlet filter and installing the replacement tankless water heater inlet filter, the tool comprising, a base portion having a bottom end and an opposing top end, the base portion having a plurality of base sidewalls around its periphery extending from its bottom end to the top end of the base, wherein the periphery of the base portion having a polygonal shape formed by the plurality of base sidewalls;

a head portion having a bottom end adjacent to the top end of the base portion, the head portion being aligned with and concentric with the base portion and the head portion having a head sidewall around its periphery extending from its bottom end to a free end of the head portion, wherein the head portion is configured and sized to fit inside the filter cap of the tankless water heater inlet filter, and the periphery of the head portion having a circular shape formed by the head sidewall; and at least one reciprocal engagement device of the head portion configured to engage with the engagement device of the tankless water heater inlet filter and as a result of rotating the base portion causing the tankless water heater inlet filter to rotate and be removed.

9. The filter kit of claim 8, wherein the circular head portion comprises a lower circular member and an upper circular member, the upper circular member having a diameter less than the lower circular member creating a ledge therebetween.

10. The filter kit of claim 9, wherein the reciprocal engagement device of the head portion comprises a first slot and a second slot perpendicular to the first slot.

11. The filter kit of claim 8, wherein the reciprocal engagement device of the head portion comprises only one slot.

12. The filter kit of claim 8, wherein the reciprocal engagement device of the head portion comprises a pair of opposing tabs extending alongside the head portion and extending from the base portion.

13. A method to remove and install a tankless water heater inlet filter using a tool comprising a base portion having a bottom end and an opposing top end, the base portion having a plurality of base sidewalls around its periphery extending from its bottom end to the top end of the base, wherein the periphery of the base portion having a polygonal shape formed by the plurality of base sidewalls; a head portion having a bottom end adjacent to the top end of the base portion, the head portion being aligned with and concentric with the base portion and the head portion having a head sidewall around its periphery extending from its bottom end to a free end of the head portion, wherein the head portion is configured and sized to fit inside a filter cap of the tankless water heater inlet filter, and the periphery of the head portion having a circular shape formed by the head sidewall, and at least one reciprocal engagement device of the head portion configured to engage with an engagement device of the tankless water heater inlet filter, the method comprising:

inserting the head portion into the filter cap to engage the engagement device of the tankless water heater inlet filter;

placing a socket over the base portion of the tool; and rotating the socket to cause the tankless water heater inlet filter to rotate in a first direction to remove the tankless water heater inlet filter from a tankless water heater inlet line.

14. The method of claim 13, further comprising inserting a replacement tankless water heater inlet filter into the tankless water heater inlet line; and rotating the socket to cause the replacement tankless water heater inlet filter to rotate in an opposing second direction to install the replacement tankless water heater inlet filter into the tankless water heater inlet line.

15. The method of claim 14, wherein the reciprocal engagement device of the head portion comprises a first slot and a second slot perpendicular to the first slot.

16. The method of claim 14, wherein the reciprocal engagement device of the head portion of the tool comprises only one slot.

17. The method of claim 14, wherein the reciprocal engagement device of the head portion of the tool comprises a pair of opposing tabs extending alongside the head portion and extending from the base portion.

* * * * *